(12) United States Patent
Carnevale et al.

(10) Patent No.: US 9,570,763 B2
(45) Date of Patent: Feb. 14, 2017

(54) HYBRID BIPOLAR PLATE FOR EVAPORATIVELY COOLED FUEL CELLS

(75) Inventors: Christopher John Carnevale, Vernon, CT (US); Timothy W. Patterson, Jr., West Hartford, CT (US); Robert M. Darling, South Windsor, CT (US); Paravastu Badrinarayanan, Waltham, MA (US); Michael L. Perry, Glastonbury, CT (US)

(73) Assignee: Audi AG, Ingolstadt (DE)

( * ) Notice: Subject to any disclaimer, the term of this patent is extended or adjusted under 35 U.S.C. 154(b) by 737 days.

(21) Appl. No.: 13/261,678

(22) PCT Filed: Dec. 23, 2010

(86) PCT No.: PCT/US2010/003240
§ 371 (c)(1),
(2), (4) Date: Jun. 20, 2013

(87) PCT Pub. No.: WO2012/087265
PCT Pub. Date: Jun. 28, 2012

(65) Prior Publication Data
US 2013/0260274 A1    Oct. 3, 2013

(51) Int. Cl.
*H01M 8/04* (2016.01)
*H01M 8/02* (2016.01)
*H01M 8/10* (2016.01)

(52) U.S. Cl.
CPC ....... *H01M 8/04029* (2013.01); *H01M 8/0267* (2013.01); *H01M 8/04164* (2013.01);
(Continued)

(58) Field of Classification Search
None
See application file for complete search history.

(56) References Cited

U.S. PATENT DOCUMENTS 5,700,595 A    12/1997    Reiser
7,504,170 B2    3/2009    Reiser et al.
(Continued)

FOREIGN PATENT DOCUMENTS

CN    101088189 A    12/2007
CN    101107743 A    1/2008
(Continued)

OTHER PUBLICATIONS

International Search Report, mailed Sep. 15, 2011, for International Application No. PCT/US2010/003240, 3 pages.
(Continued)

*Primary Examiner* — Barbara Gilliam
*Assistant Examiner* — Adam A Arciero
(74) *Attorney, Agent, or Firm* — Seed IP Law Group LLP

(57) ABSTRACT

A fuel cell power plant (36) has vertical fuel cells (102) each sharing a half of a hybrid separator plate (100) which includes a solid fuel flow plate (105) having horizontal fuel flow channels (106) on one surface and coolant channels (108) on an upper portion of the opposite surface, bonded to a plain rear side of a porous, hydrophilic oxidant flow field plate (115) having vertical oxidant flow channels (118). Coolant permeates through the upper portion of the porous, hydrophilic oxidant flow field plates and enters the oxidant flow channels, where it evaporates as the water trickles downward through the oxidant flow field channels, thereby cooling the fuel cell.

12 Claims, 5 Drawing Sheets

(52) U.S. Cl.
CPC ..... *H01M 8/04291* (2013.01); *H01M 8/1004* (2013.01); *Y02E 60/521* (2013.01)

(56) References Cited

U.S. PATENT DOCUMENTS

| | | | |
|---|---|---|---|
| 7,579,098 B2 | 8/2009 | Reiser et al. | |
| 2005/0287416 A1 | 12/2005 | Ikezoe | |
| 2007/0072031 A1* | 3/2007 | Darling | H01M 8/0267 |
| | | | 429/413 |
| 2007/0117001 A1 | 5/2007 | Farrington et al. | |
| 2011/0117469 A1* | 5/2011 | Kanuri | H01M 8/0276 |
| | | | 429/444 |

FOREIGN PATENT DOCUMENTS

| | | | | |
|---|---|---|---|---|
| JP | 2005-149827 A | 6/2005 | | |
| WO | 2004/109822 A2 | 12/2004 | | |
| WO | 2006/071209 A1 | 7/2006 | | |
| WO | 2006/071220 A1 | 7/2006 | | |
| WO | 2006/071580 A2 | 7/2006 | | |
| WO | 2006/071592 A1 | 7/2006 | | |
| WO | 2007/011348 A1 | 1/2007 | | |
| WO | WO 2010005415 A1 * | 1/2010 | ......... | H01M 8/0276 |

OTHER PUBLICATIONS

Extended European Search Report, dated Aug. 11, 2016, for European Application No. 10860954.6-1360 / 2656422, 8 pages.

* cited by examiner

HYBRID BIPOLAR PLATE FOR EVAPORATIVELY COOLED FUEL CELLS

TECHNICAL FIELD

A hybrid bipolar plate, including solid horizontal fuel flow fields and porous vertical oxidant flow fields bonded together, includes water coolant channels exclusively on the upper edge of the solid fuel flow field portion of the hybrid plate, to provide coolant water through the porous oxidant flow field plate and trickling downward in the oxidant flow channels to thereby evaporatively cool the fuel cell with water provided by the channels in the fuel flow field plate portion.

BACKGROUND ART

It is known in the fuel cell art to evaporatively cool fuel cells, thereby deriving the benefit of the heat of vaporization, in contrast with conveying sensible heat to circulating water passing through the cells or coolant passing through coolant plates.

Referring now to FIG. 1, an evaporatively cooled fuel cell power plant 36 of U.S. Pat. No. 7,579,098 includes a stack 37 of fuel cells 38 which are vertically disposed.

Fuel from the source 41 is provided to a fuel inlet 42 and flows to the right in a first fuel pass, as indicated by the bold arrow 43, to a fuel turn manifold 44. The fuel gas then flows downwardly and into a second fuel pass of the fuel flow fields, wherein the fuel gas flows to the left as indicated by the bold arrow 45. From a fuel outlet 47, the fuel may flow through a recycle pump 48 (perhaps with valves not shown) back to the fuel inlet 42, and may be periodically purged to ambient through a valve 49, all as is known in the art. Single pass, triple pass or other fuel flow configurations may be used.

In FIG. 1, process air is provided by a pump 52 to an air inlet 53, and the air flows upwardly through the oxidant reactant gas flow channels of the fuel cells 38, as indicated by the hollow arrow 54. From a process air outlet 57, the air flows in a conduit 58 to a condenser 59, which in a vehicle may be a conventional radiator. The drier exit air is passed through an exhaust 62. The condensate from the condenser 59 may be conducted for accumulation in a reservoir 64, which is connected by a water return conduit 65 to a water inlet 66. The water then flows through fluid conduits, typically minute passageways 67, into each of the fuel cells 38; the passageways 67 may terminate in a vent manifold 68, from which removal of gas from the passageways is provided through a vent, such as a porous hydrophobic-plug vent 69; or, when suitable in any given case, the passageways may be dead-ended, or they may be connected to a micro pump at the vent 69, as known.

Although there is a water inlet 66, there is basically no water outlet, the water is simply present in each fuel cell as described more fully with respect to FIG. 2. In FIG. 2, fuel cells 38 each comprises a conventional membrane electrode assembly 72, which includes an electrolyte with anode and cathode catalysts on opposite sides thereof and may or may not include a gas diffusion layer on one or both electrodes.

In FIG. 2, fuel reactant gas flows through channels 74 in fuel reactant gas flow field plates 75, which includes grooves 76, that together with grooves 77 of an adjacent fuel cell, form minute water passageways 78. On the cathode side, an oxidant reactant gas flow field plate 81 includes process air flow channels 82 and grooves 83 which, with grooves 84 on an adjacent fuel cell, together form minute water passageways 85.

To prevent flooding, the reactant gases are typically a few Kilopascals (about one-half psi) higher than the pressure of water in the passageways. This will naturally occur as a consequence of the air pump 52 generally causing the air to be that much above atmospheric pressure, and the pressure of the fuel is easily regulated, as is known. In FIG. 1, the water in the conduit 65 may be at atmospheric pressure but could be at a pressure other than atmospheric, provided the reactant gases have a slightly higher pressure.

The water passageways may be formed other than by matching grooves as shown. Water passageways 67 may be provided in only one of the reactant gas flow field plates 75, 81.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700,595. However, because there is about a one hundred-to-one improvement in cooling effectiveness per volume of water when evaporative cooling is used, in comparison with the sensible heat water flow cooling of the aforesaid '595 patent, the water flow channels in the prior art have cross sections which are several tens of times larger than the cross sections of the water passageways 78, 85 in FIG. 1. In addition, the spacing of the lateral portions of the water passageways 78, 85 (shown at each juncture of the fuel cells in FIG. 3) may be separated by a distance which is several times greater than the spacing between lateral portions of water flow channels in sensible heat, water flow cooling systems, as in the aforesaid '595 patent. The small cross section of the water passageways 78, 85, and the large distance between successive lateral portions thereof permit the thickness of the reactant gas flow field plates 75, 81 to be reduced by about one-third.

The evaporatively cooled fuel cell of the art as described with respect to FIGS. 1 and 2 has since enjoyed additional improvements and variations. Such a fuel cell combination is very advantageous, as described hereinbefore. However, the manufacture of the plates, particularly if they have grooves on both sides, is expensive both in terms of the materials used and the machining required to achieve suitable plates that are within tolerance. Because the fuel cells are separated one from the other, thereby avoiding crossover of fuel into the oxidant plates and/or oxidant into the fuel plates, bubble pressure in the fuel and oxidant plates 81, 75 must be carefully controlled such that water will flow through the plates, but gas will not. The porosity, pore size and pore volume is therefore critical as well. To ensure that flow of water into the reactant gases is avoided, the coolant water typically is one or several psi's (0.7 or 1.5 kPa's) below the reactant gas pressure.

In order to ease manufacturing processes, reduce cost of wasted material, and achieve adequate separation of the fuel cells and humidification of the anode side and the proton exchange membrane, the use of end milling is typical.

Flow field plates, or a separator plate, which are more easily manufactured and do not require bubble pressure tolerances would be advantageous.

SUMMARY

The hybrid separator plate herein comprises a solid fuel flow field plate, having a few horizontal water channels formed in the upper backside of the plate, bonded to a porous, hydrophilic vertical flow, oxidant flow field plate which has no channels provided on its back side. Water in the few coolant channels at the upper edge of the fuel flow field portion permeates into the porous, hydrophilic oxidant flow field portion, and the coolant water flows into the vertical oxidant flow channels, and trickles down inside the flow channels, where it evaporates thereby cooling the fuel cell stack.

The hybrid plate requires channels to be formed primarily only on one side of each portion of the hybrid separator plate, with only a few water channels formed on the reverse side of the upper edge of the fuel flow field portion. Instead of requiring end milling, gang milling can be utilized, and tolerances can be relaxed since there is no need to control bubble pressure as a means for separating the fuel of one fuel cell from the oxidant of the adjacent fuel cell.

The hybrid flow field plate is considerably less expensive than those previously used for evaporatively cooled fuel cells, and is a reliable means of avoiding crossover of the reactant gases.

Other variations will become more apparent in the light of the following detailed description of exemplary embodiments, as illustrated in the accompanying drawings.

MODE(S) OF IMPLEMENTATION

Figure 1:
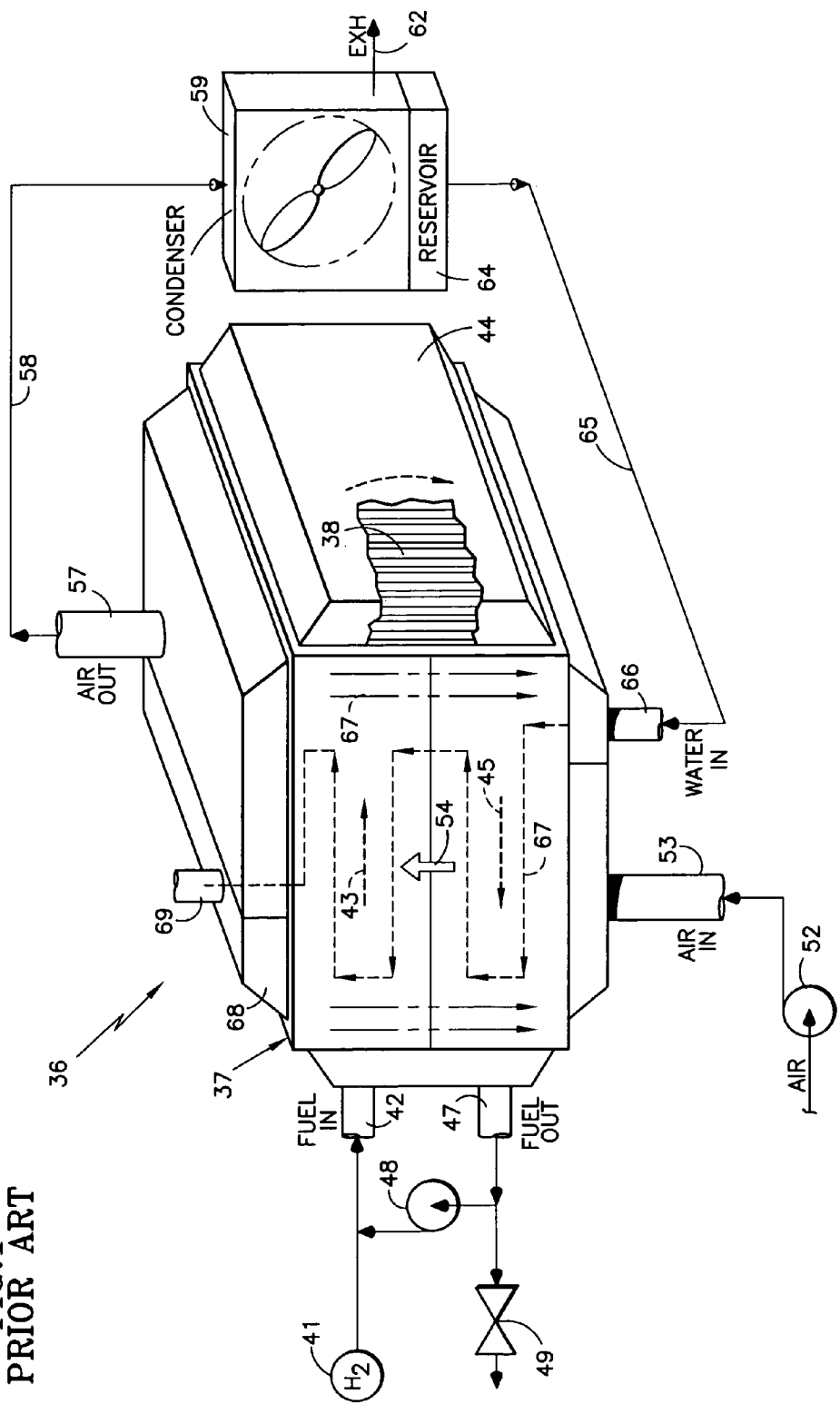
FIG. 1 is a simplified perspective view of a fuel cell power plant employing water transport plates with evaporative cooling, known to the prior art.
Figure 2:
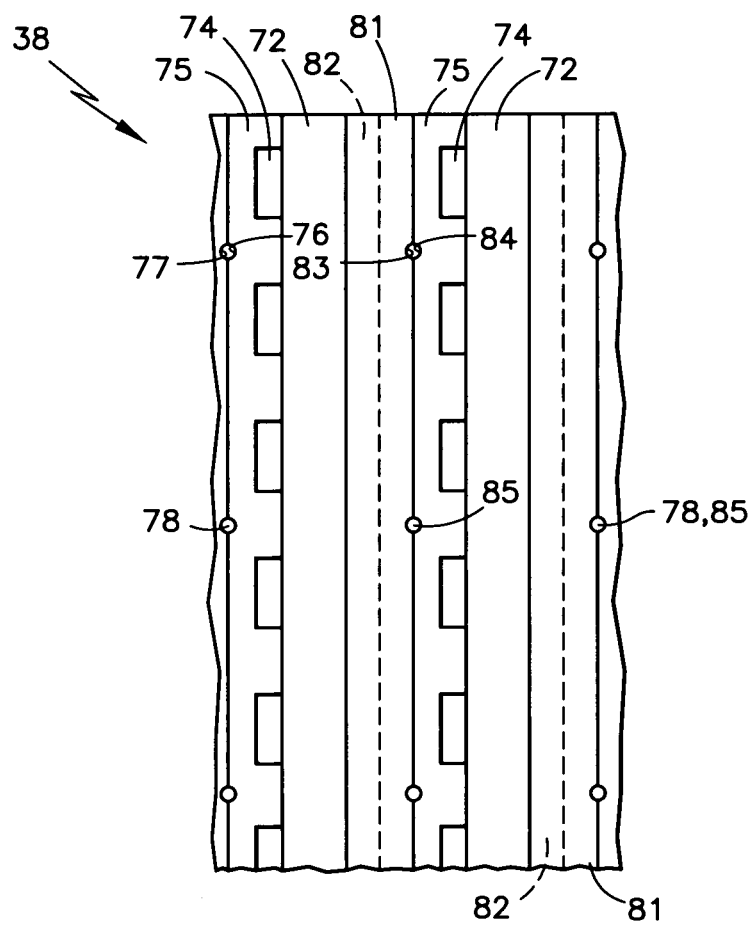
FIG. 2 is a partial, sectioned side elevation view of a pair of fuel cells, with sectioning lines omitted for clarity, known to the prior art.
Figure 3:
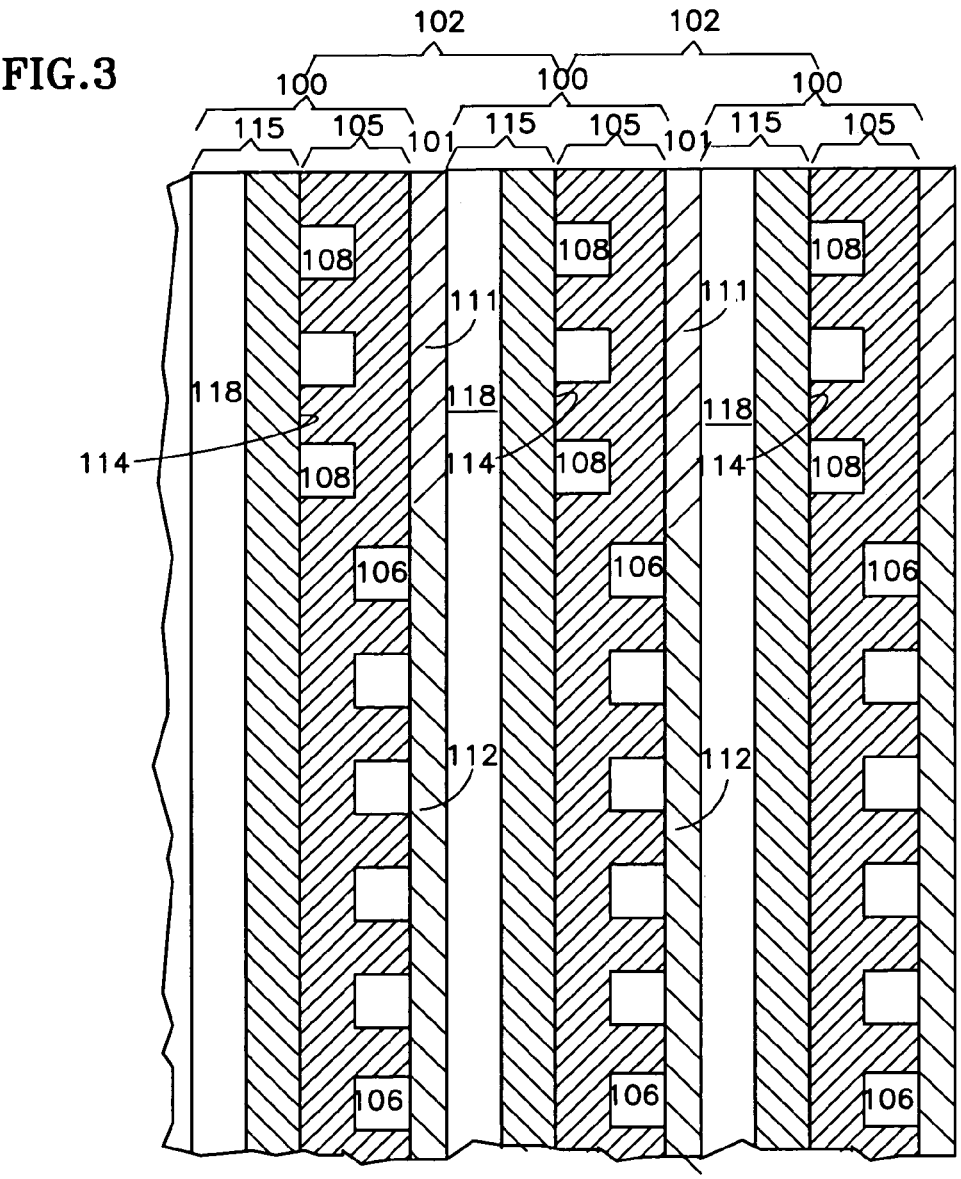
FIG. 3 is a partial, sectioned side elevation view of a pair of fuel cells employing the hybrid separator plate hereof.
Figure 4:
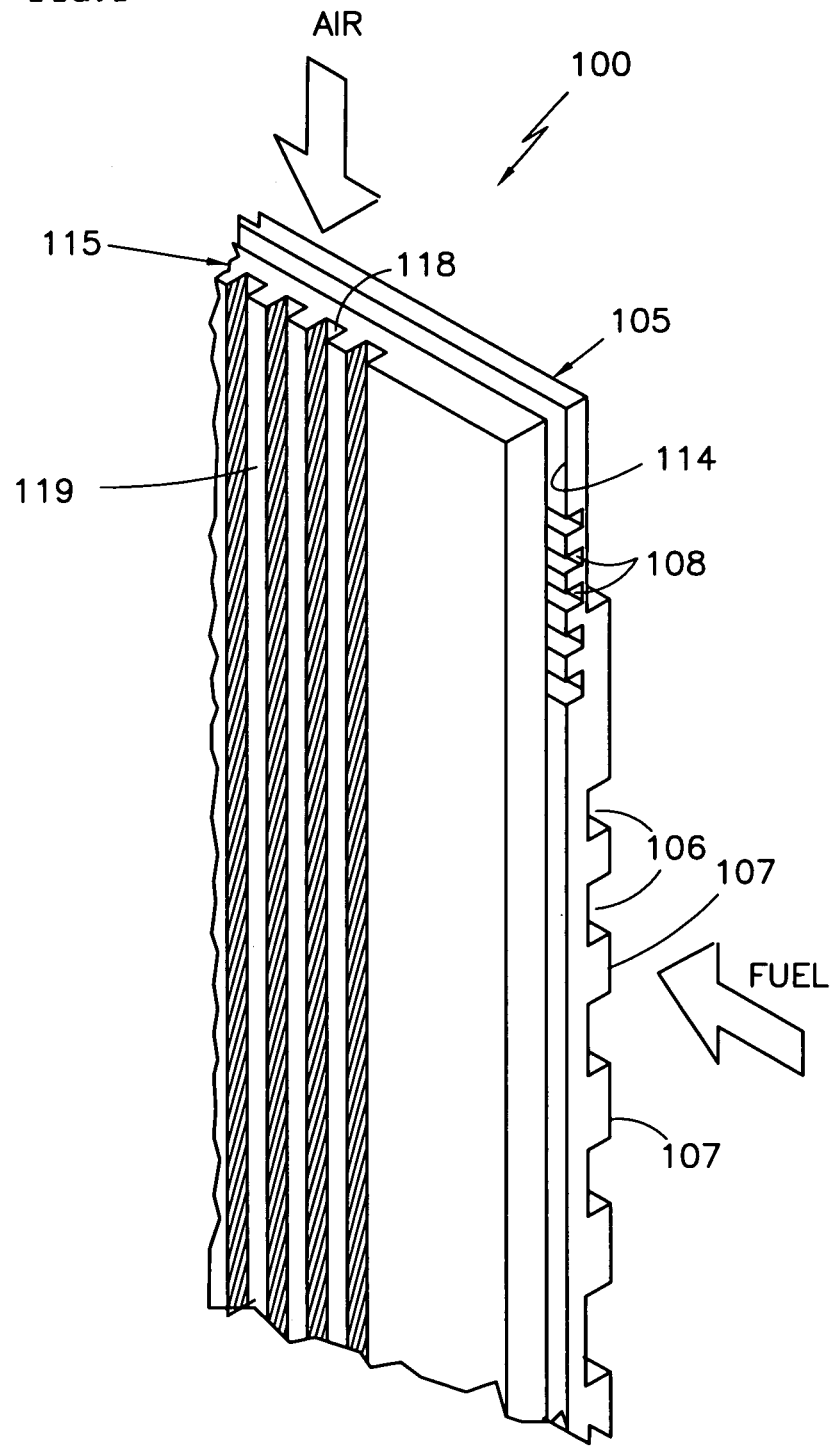
FIG. 4 is a partial, simplified, perspective view of the fuel cell bipolar plate of FIG. 3.

Referring to FIGS. 3 and 4, hybrid separator plates 100 are positioned on opposite surfaces of membrane electrode assemblies (MEA's) 101 so as to form fuel cells 102. The MEA 101 may or may not have gas diffusion layers in addition to cathode and anode catalyst layer supports. Each separator plate 100 includes, on the anode side of the MEA 101, a solid fuel flow field plate 105 having fuel flow channels 106 on a surface thereof adjacent to and in contact with the MEA 101. A plurality of water coolant channels 108 are formed at an upper end (in earth's axis) of the opposite surface of the fuel flow field channels 106. The water channels 108 extend downwardly into the planform of the fuel flow field channels 105 only to the same extent that an upper portion 111 of the MEA 101 is a non-active portion, that is, which does not have cathode and anode catalyst layers on either side of a proton exchange membrane, in contrast with the substantial part of the planform 112 which is active. The extent of the coolant channels 108 amounts to a relatively small portion of the planform of the fuel flow plates 105, such as on the order of less than 15%, and preferably less than 10% along the vertical length of the fuel flow plates 105.

The back surface of the fuel flow field plates 105 are each bonded at a joint 114 to a plain backside of a porous, hydrophilic oxidant flow field plate 115. The oxidant flow field plates 115 have vertical oxidant reactant gas flow channels extending inwardly from a surface thereof which is opposite to the surface where the plates are bonded together at the joint 114.

The bonding of the plates is preferably achieved with a minimum of electrical resistivity in order to maintain an advantageous stack voltage. One manner of bonding the two plates together is to provide a very thin coat of a thermoplastic resin such as low density polyethylene on a peripheral portion of the rear surface of the fuel flow field plate (like a picture frame), and then heating it to a suitable temperature, such as between about 245 F (118 C) and about 280 F (138 C) at a pressure of between about 40 psi (276 kPa) and about 100 psi (690 kPa), so that the thermoplastic resin utilized in forming the porous, hydrophilic oxidant flow field plate 115 will meld with the thin layer provided to the fuel flow plate 105.

Because the coolant flow channels 108 are at a different portion of the fuel flow field plates 105, than are the fuel flow field channels 106, the fuel flow field plates can be thinner than heretofore possible, thereby promoting a greater power density in the fuel cell stack. The notch at the upper right face of the fuel flow field plates 105 is to accommodate the conventional interfacial seal.

Although the coolant channels 108 are preferably formed on the reverse side of the fuel flow field plate 105, in any given implementation of the hybrid flow field plate herein, if found to be necessary or desirable, the coolant channels 108 may be provided instead in the oxidant flow field plate 115, or in both plates. However, the simplest and less costly manufacture will be providing the coolant channels 108 in the solid fuel flow plate 105.

Figure 5:
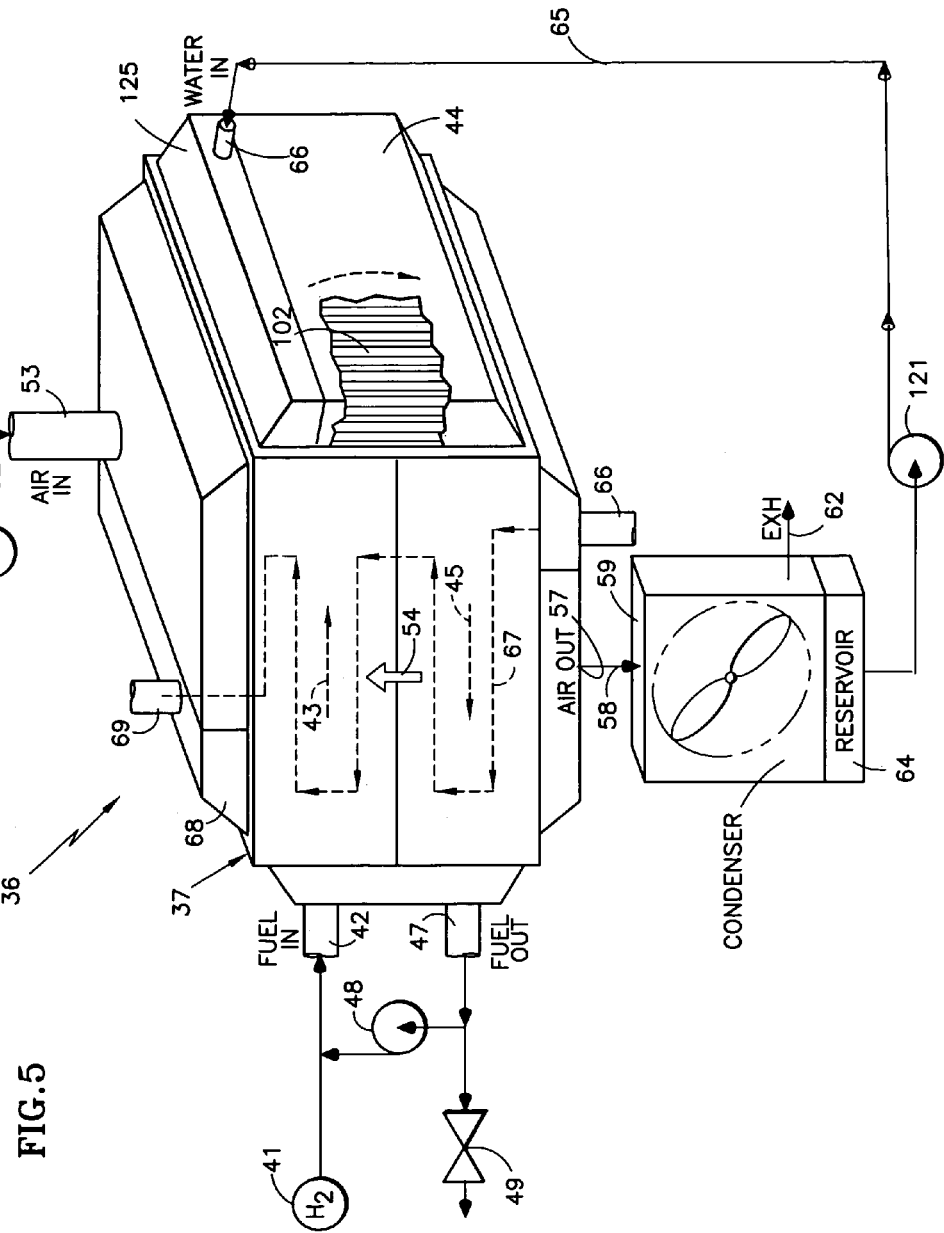
FIG. 5 is a simplified perspective view of a fuel cell power plant employing the hybrid separator plate hereof.

As illustrated in FIG. 5, the fuel cells themselves are vertically mounted in the fuel cell stack 37. The hybrid separator plates 100 are mounted in the stack so that the oxidant flow field channels 118 are vertical, as indicated by the dot/dash arrows 67, whereas the fuel flow channels 106 are horizontal as indicated by the arrows 43, 45.

In the fuel cell power plant 36, each of the fuel cells shares one of the hybrid separator plates 100 with an adjacent fuel cell (except, of course, for accommodations at the ends of the stack). With the fuel cells oriented vertically, having the oxidant flow channels 118 vertical and the coolant flow channels 108 horizontal, water in the coolant channels 108 will permeate the porous, hydrophilic oxidant flow field plate portion 115 of the hybrid plate, will enter and trickle down within the oxidant channels 118, and be evaporated into the downwardly flowing air. The heat of reaction will evaporate a significant amount of the water, thereby keeping the fuel cell within the desired temperature range of between about 176 F (80 C) and about 180 F (85 C).

Referring to FIG. 5, a fuel cell power plant utilizing the hybrid separator plate herein includes a stack 37 of fuel cells 102 of the type described with respect to FIGS. 3 and 4 hereinbefore. The air from a pump 52 flows downwardly through an air inlet 53 and through the fuel cells as indicated by the hollow arrow 54. An air outlet 57 is connected by a conduit 58 to a condenser 59 which has an exit 62 for substantially dry air and a reservoir 64. The water in the air flowing downwardly through the fuel cells 102 is evaporated by the heat in the fuel cells, creating water vapor which is condensed from the moist air in the condenser 59, and collected in a reservoir 64. The reservoir is connected by a conduit 65 to an inlet 66 of a water inlet manifold 125 which provides water to the coolant channels 108 illustrated in FIGS. 3 and 4.

In order to assist water permeation through the porous, hydrophilic oxidant flow field plate portion 115, so that it can easily reach the oxidant flow channels 118, the pressure of the coolant may be controlled by a pump 121 and valving (not shown), if necessary. The pressure may, for instance, be 0.5 psi, (3.5 kPa) above the air pressure.

The fuel flow field channels 106 may be between about 0.7 mm and about 2.2 mm wide, with between-groove ridges 107 between about 0.7 mm and about 1.5 mm therebetween, and having a depth of between about 0.2 mm and about 1.0 mm in each instance, in a fuel flow plate portion 105 between about 0.6 mm and about 1.0 mm thick. The air flow field channels 118 may have a width of between about 0.9 mm and about 2.5 mm, with between-groove ribs 119 having a width of between about 0.7 mm and about 1.5 mm, with a depth of between about 0.3 mm and about 0.6 mm in an oxidant flow field plate portion 115 between about 0.6 mm and about 1.0 mm thick.

Since changes and variations of the disclosed embodiments may be made without departing from the concept's intent, it is not intended to limit the disclosure other than as required by the appended claims.

The invention claimed is:

1. A fuel cell power plant comprising:
a stack of vertically disposed fuel cells, at least one of the fuel cells including a membrane electrode assembly with an electrolyte having cathode and anode catalysts disposed on opposite sides thereof, the membrane electrode assembly being separated from another membrane electrode assembly adjacent thereto in said stack by a hybrid separator plate;
the hybrid separators plate comprising a solid fuel flow field plate having horizontal fuel reactant gas flow channels that extend from one end of the fuel flow field plate to an opposing end of the fuel flow field plate in a horizontal direction and that extend inwardly from a first surface of the fuel flow field plate, and a porous and hydrophilic oxidant flow field plate having vertical oxidant flow channels that extend from one end of the oxidant flow field plate to an opposing end of the oxidant flow field plate in a vertical direction and that extend inwardly from a first surface of the oxidant flow field plate, a second surface of said oxidant flow field plate, opposite to said first surface thereof, bonded to a second surface of said fuel flow field plate which is opposite to said first surface thereof, to form said hybrid separator plate, there being horizontal water passageways that extend from one end of the hybrid separator plate to an opposing end of the hybrid separator plate in a horizontal direction adjacent said second surfaces of said plates.

2. A fuel cell power plant according to claim 1 wherein:
said horizontal water passageways extend inwardly into the fuel flow field plate from an upper portion of said second surface of said fuel flow field plate.

3. A fuel cell power plant according to claim 1 wherein:
said horizontal water passageways are disposed over an upper portion of said fuel flow field plate which is adjacent to a portion of a respective membrane electrode assembly that does not have catalyst.

4. A fuel cell power plant according to claim 1 wherein:
said horizontal water passageways are disposed over an upper 15%, by area, of said hybrid separator plate.

5. A fuel cell power plant according to claim 1 wherein:
said horizontal water passageways are disposed over an upper 10%, by area, of said hybrid separator plate.

6. A fuel cell power plant according to claim 1 wherein:
said catalysts are disposed over an active, lower portion of said membrane electrode assembly and are not disposed over an inactive, upper portion of said membrane electrode assembly, and said horizontal water passageways are disposed only over an upper portion of said fuel flow fields plate adjacent to the inactive, upper portion of the membrane electrode assembly.

7. A fuel cell power plant according to claim 6 wherein:
the inactive, upper portion of the membrane assembly comprises less than 15% of the membrane electrode assembly by area.

8. A fuel cell power plant according to claim 6 wherein:
the inactive, upper portion of the membrane electrode assembly comprises less than 10% of the membrane electrode assembly by area.

9. A fuel cell power plant according to claim 1 wherein:
said second surfaces are bonded together with a peripheral layer of thermoplastic.

10. A fuel cell power plant according to claim 1 wherein:
said fuel reactant gas flow channels extend inward into the feel flow field plate only from a portion of said first surface of said fuel flow field plate which is opposite to a related portion of said second surface of said fuel flow field plate having no horizontal water passageways.

11. A fuel cell power plant according to claim 1, further comprising:
a condenser connected to exits of said oxidant flow channels, condensate of said condenser being in fluid communication with said horizontal water passageways, whereby water can migrate from said horizontal water passageways through said porous and hydrophilic oxidant flow field plate into said oxidant flow channels to be evaporated.

12. A fuel cell power plant according to claim 1 wherein vertical and horizontal are vertical and horizontal, respectively, relative to an axis of earth's gravity.

* * * * *